J. B. EWELL.
Grain-Drill.
No. 67,860. Patented Aug. 20, 1867.
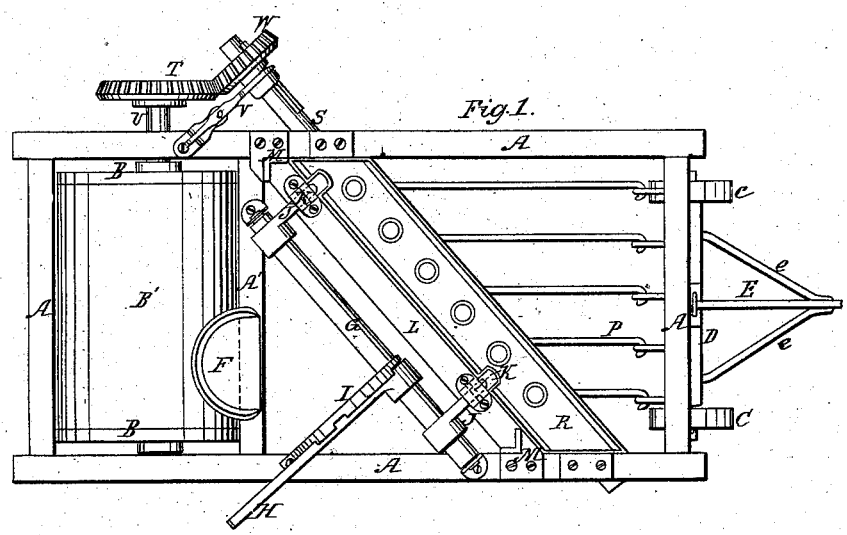
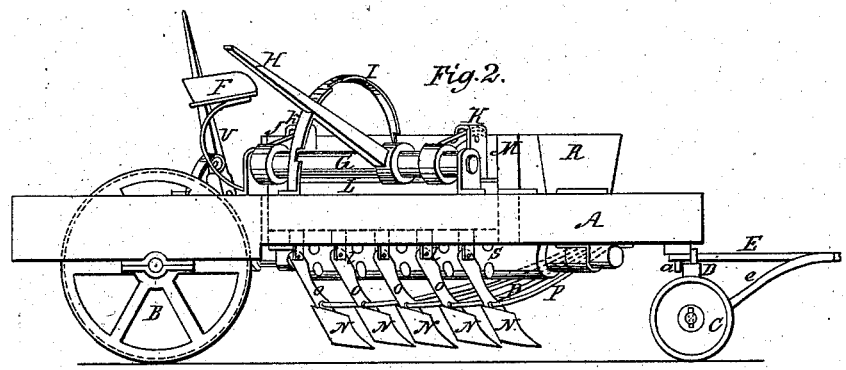

United States Patent Office.

JAMES B. EWELL, OF BALTIMORE, MARYLAND.

Letters Patent No. 67,860, dated August 20, 1867.

IMPROVEMENT IN SEEDING-CULTIVATOR.

*The Schedule referred to in these Letters Patent and making part of the same.*

TO ALL WHOM IT MAY CONCERN:

Be it known that I, JAMES B. EWELL, of the city of Baltimore, and State of Maryland, have invented a new and useful Improvement in Seeding-Cultivators, of which the following is a full, clear, and exact description, reference being had to the accompanying drawings, which make part of this specification, and in which—

Figure 1 represents a plan or top view, and

Figure 2 a side elevation of my improved machine.

It is the object of my invention to plough the ground, sow the seed, and roll the surface smooth by a single passage of the machine over the field, and my improvement consists in a novel method of combining the devices for effecting this object, as hereinafter explained.

To carry out my invention I mount a strong, rectangular frame, A, upon two wheels B, turning on an axle in the rear of the frame, and upon two smaller supporting-wheels C, forming a truck capable of turning freely under the frame, so as to turn the frame short round when required. The wheels C are mounted on an axle, D. A tongue, E, projects from this axle, and is stiffened by braces e. The rear end of the tongue projects back of the axle, and is provided with an eye into which a hook, a, on the under side of the frame takes, which arrangement allows the truck readily to be detached when required. When a roller is required, two semi-cylinders, B', are placed between the hind wheels, and secured to them in any well-known way. A seat, F, for the driver is mounted on a cross-beam, A', in front of the hind wheels. A rock-shaft, G, is arranged diagonally across the frame, being controlled by a lever, H, taking into a segment-rack, I, on the frame. Wipers or cams J on the rock-shaft work in loops K on a diagonal beam, L, moving vertically in guides M on the frame. A series of ploughs, N, is secured in any well-known way to legs O pivoted to projections l under the beam L, so as to permit them to play freely back and forth. The ploughs are held in proper position by drag-bars P, pivoted to the front cross-bar of the frame A. The bars may be connected to their standards by pins, which will break when an obstruction is encountered, and thus prevent injury to the ploughs. A feed-hopper, R, is arranged diagonally across the frame in front of the rock-shaft. A rotating feed-cylinder, S, is arranged beneath this hopper, and provided with holes in its perimeter, in which the seeds fall from the hopper, and are dropped in the usual way. This cylinder is rotated by a bevel-wheel, T, on the axle U of the wheels B, which bevel-wheel drives a corresponding pinion, W, on the cylinder-shaft. The pinion slides freely endwise on the shaft, but is kept from turning independently of it by a clutch and feather. The mechanism is thrown into and out of gear by a shipping lever, V, pivoted on the frame, the handle of which extends up to the driver's seat, while the lower end is forked and embraces a collar on the pinion.

The operation of my improved machine will readily be understood from the foregoing description. For sowing in drills the hopper is filled, and the cylinder thrown into gear, and the ploughs lowered into the ground to the depth desired for the furrow. As the machine advances each plough opens a furrow, into which the seed is dropped from the cylinder. Besides opening a furrow each plough covers the seed dropped in the furrow made by the plough in advance of it. The roller smooths the surface, breaking up clods, &c. For broadcast sowing the ploughs are lifted out of the ground and an apron placed in front of them, on which the seeds fall from the cylinder and are scattered.

The ploughs may be made removable or reversible, and can be so arranged as to throw the earth to or from the plants, as required. For tall crops the centre plough may be removed.

When it is desired to use the roller only the ploughs can be lifted out of the ground, and when a cultivator only is wanted the semi-cylinders forming the roller can be separated from the hind wheels. The truck can also be used separately for many useful purposes.

It will thus be seen that my invention gives the farmer a truck, a roller, a cultivator, and a seeding machine, all combined in a single machine, and each operating effectively either singly or in combination with the others.

Having thus described my improved machine, what I claim therein as new, and desire to secure by Letters Patent, is—

1. The detachable swivelling front truck, constructed and combined with the frame, as described.

2. The combination, substantially as described, with the main frame, of the diagonally-arranged ploughs, having drag-bars of varying lengths.

3. The combination, substantially as described, of the diagonally-arranged rocking-lever and cams with the vertically-moving plough-beam L.

4. The combination, as described, of the diagonally-arranged hopper and feed-cylinder with the frame.

5. The combination of the diagonal seeding-cylinder, the driving-gear, and the shipping mechanism, with the main frame and driver's seat, as and for the purpose described.

6. The combination, substantially in the manner described, in a seeding-cultivator of a seed-hooper, a feeding-cylinder, and a series of ploughs, all arranged diagonally to the path of the machine.

7. The combination, substantially in the manner described, of the leading truck, the cultivating mechanism, the seeding mechanism, and the roller.

In testimony whereof I have hereunto subscribed my name.

JAMES B. EWELL.

Witnesses:
 G. E. SANGSTON,
 H. A. EMMONS, Jr.